(12) United States Patent
Beppu

(10) Patent No.: US 10,954,089 B2
(45) Date of Patent: Mar. 23, 2021

(54) TRANSPORT APPARATUS

(71) Applicant: SEIKO EPSON CORPORATION, Tokyo (JP)

(72) Inventor: Wataru Beppu, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 24 days.

(21) Appl. No.: 16/238,563

(22) Filed: Jan. 3, 2019

(65) Prior Publication Data

US 2019/0210826 A1 Jul. 11, 2019

(30) Foreign Application Priority Data

Jan. 5, 2018 (JP) .............................. JP2018-000582
May 18, 2018 (JP) .............................. JP2018-096513

(51) Int. Cl.
*B65H 7/06* (2006.01)
*B65H 5/06* (2006.01)
*B65H 7/20* (2006.01)
*H04N 1/00* (2006.01)

(52) U.S. Cl.
CPC ................. *B65H 7/06* (2013.01); *B65H 5/06* (2013.01); *B65H 7/20* (2013.01); *B65H 2511/11* (2013.01); *B65H 2511/13* (2013.01); *B65H 2511/528* (2013.01); *B65H 2511/529* (2013.01); *B65H 2515/704* (2013.01); *H04N 1/00029* (2013.01); *H04N 1/00724* (2013.01); *H04N 1/00779* (2013.01)

(58) Field of Classification Search
CPC ...... B65H 7/06; B65H 7/20; B65H 2511/528; B65H 2515/704; B65H 2511/13; B65H 2511/11
See application file for complete search history.

(56) References Cited

U.S. PATENT DOCUMENTS

| | | | |
|---|---|---|---|
| 8,919,760 B2* | 12/2014 | Kato | B65H 5/06 271/10.03 |
| 9,278,820 B2* | 3/2016 | Yamaguchi | B65H 7/02 |
| 9,415,961 B2* | 8/2016 | Nobuta | H02P 29/032 |
| 9,969,592 B2* | 5/2018 | Kowase | B65H 43/04 |
| 9,988,227 B2* | 6/2018 | Kumagai | G03G 15/6567 |
| 2011/0129274 A1 | 6/2011 | Sunaga et al. | |
| 2017/0269535 A1* | 9/2017 | Suzuki | G03G 15/6529 |

FOREIGN PATENT DOCUMENTS

CN 102079180 A 6/2011
JP 2012-025503 A 2/2012

* cited by examiner

*Primary Examiner* — Jeremy R Severson
(74) *Attorney, Agent, or Firm* — Global IP Counselors, LLP

(57) ABSTRACT

In a continuous mode, when a state in which a current value, which is output of a load detecting sensor, is equal to or more than a predetermined threshold (a current value) continues for a predetermined threshold (the number of times), it is determined that transportation is abnormal. In a cumulative mode, when the total number of times by which the current value, which is the output of the load detecting sensor, is equal to or more than the predetermined threshold (the current value) is equal to or more than a predetermined threshold, it is determined that the transportation is abnormal. A controller sets a detection mode of a first medium to the continuous mode, and sets a detection mode of a second medium to the cumulative mode.

10 Claims, 5 Drawing Sheets

PAPER SHEET SELECTION
- A3: PORTRAIT
- A4: PORTRAIT     ◦ A4: LANDSCAPE
- B4: PORTRAIT
- B5: PORTRAIT     ◦ B5: LANDSCAPE
- B5: FREE LENGTH  [      ] INCH

FIG. 2

TRANSPORT APPARATUS

CROSS REFERENCES TO RELATED APPLICATIONS

The present invention contains subject matter related to Japanese Patent Application Nos. 2018-000582 and 2018-096513 filed in the Japanese Patent Office on Jan. 5, 2018 and May 18, 2018, the entire contents of which are incorporated herein by reference.

BACKGROUND

1. Technical Field

The present invention relates to a transport apparatus, and particularly to, a transport apparatus that transports a printing medium, or the like.

2. Related Art

A transport apparatus is used in a scanner, a printer, or the like. For example, in the case of the scanner, the transport apparatus transports a manuscript to a discharge port along a predetermined transport path via an image reading position. A driving source used by the transport apparatus includes an electric motor such as a direct current (DC) motor.

The transport apparatus stops the transportation when detecting a transport error, for example, a paper jam.

When the error is detected at an early time, a damage to the manuscript can be suppressed.

A transport apparatus disclosed in JP-A-2012-25503 monitors a current value of the DC motor which is the driving source, and detects a transport error based on an abnormal value of the current value generated when an abnormal load occurs. That is, the transport apparatus calculates a state of the load from the current value, and integrates the number of times by which an abnormal load state (an overload state) obtained from the current value occurs. When the integrated value exceeds a predetermined reference value, the transport apparatus determines that the transport apparatus is in an overload state.

In this determination of the overload, although it is necessary to avoid determining that a transport apparatus is in an abnormal state when the transport apparatus is not in the abnormal state, abnormality can be promptly detected when the abnormality occurs.

SUMMARY

An advantage of some aspects of the invention is to provide a transport apparatus that can detect an abnormal state such as a paper jam.

A transport apparatus according to an aspect of the invention includes a transport mechanism that includes a driving source and transports a medium, a sensor that detects a load on the transportation of the transport mechanism, and a processor that receives a result of the detection by the sensor and controls the transportation by the transport mechanism, in which the processor acquires a type of the medium to be transported, and determines whether the transportation is normal or abnormal based on the acquired type of the medium and output of the sensor.

BRIEF DESCRIPTION OF THE DRAWINGS

The invention will be described with reference to the accompanying drawings, wherein like numbers reference like elements.

FIG. 2 is a diagram illustrating a selection screen indicating a transport length.

DESCRIPTION OF EXEMPLARY EMBODIMENTS

First Embodiment

Hereinafter, embodiments of the invention will be described with reference to the accompanying drawings.

Figure 1:
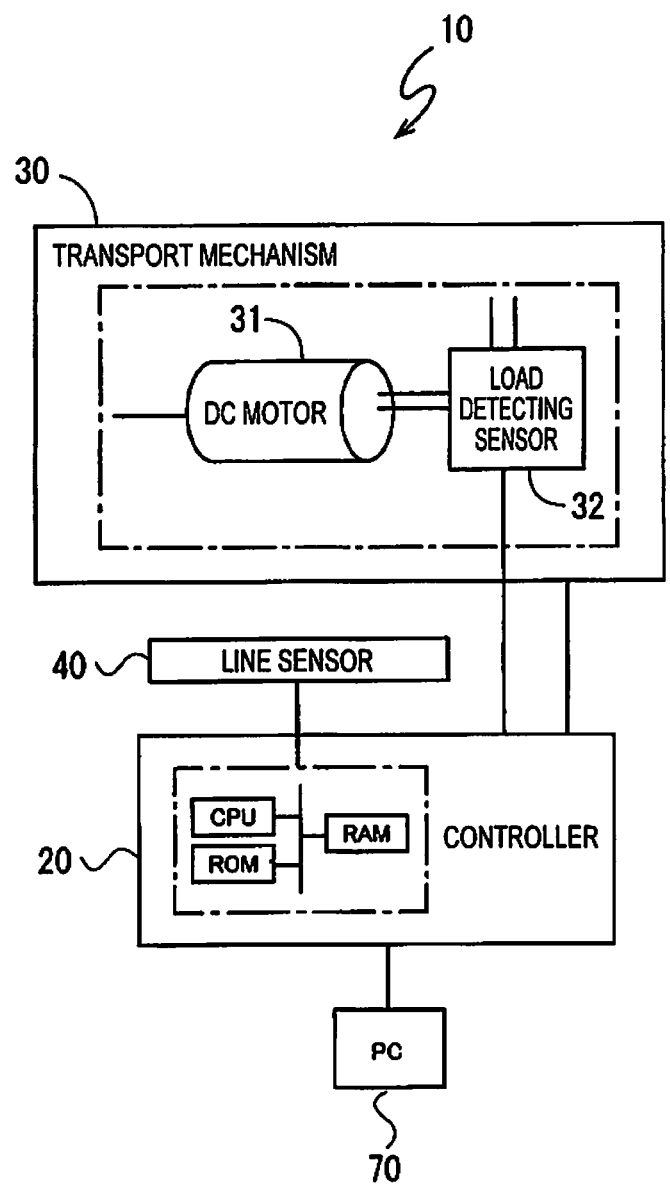
FIG. 1 is a block diagram illustrating a schematic configuration of a scanner to which an embodiment of the invention is applied.

FIG. 1 is a block diagram illustrating a schematic configuration of a scanner to which an embodiment of the invention is applied.

In FIG. 1, a scanner 10 includes a controller 20 corresponding to a processor.

The controller 20 includes a central processing unit (CPU), a read-only memory (ROM), and a random access memory (RAM) therein, and the controller 20 controls each component in the scanner 10. The scanner 10 includes a transport mechanism 30 and a line sensor 40. The transport mechanism 30 includes one or a plurality of driving motors and a transport path. When the driving motor is driven according to a control signal from the controller 20, the transport mechanism 30 sucks one uppermost medium supplied to a not-illustrated stacker, causes the medium to pass through the transport path, and transports the medium to a not-illustrated paper discharge stacker. In the present embodiment, a transport apparatus incorporated in the scanner 10 will be described. An application specific integrated circuit (ASIC) may be used instead of the CPU, or the CPU and the ASIC may cooperate with each other.

A driving motor used for the transport mechanism 30 is a DC motor 31. The transport mechanism 30 includes a load detecting sensor 32 that detects a load flowing to the DC motor 31 which is a driving source. The load detecting sensor 32 is a measurement sensor (an ammeter) that detects a current value, and is connected to the controller 20. The controller 20 acquires a load of the transport mechanism 30 based on a current value (a result of the detection) detected by the load detecting sensor 32.

Although the load detecting sensor 32 monitors the current value flowing in the DC motor 31, an element to be detected is not limited to the current value. For example, when a driving force of the DC motor 31 is controlled by PWM control, the PWM control itself is controlled to generate a necessary driving force based on the load. Thus, since the load is detected within the PWM control, the controller 20 may use this information.

When the controller 20 controls the transport mechanism 30 to transport a paper sheet or the like which is the medium along the transport path, the line sensor 40 disposed to be perpendicular to the transport path outputs, to the controller 20, a reading signal corresponding to brightness or color of the medium. Then, the controller 20 generates image data based on a transport situation of the medium and the reading signal, and outputs an output signal corresponding to the image data to a not-illustrated external apparatus. In this way, the transport mechanism 30 transports the medium along a predetermined transport path.

The scanner 10 is connected to an external PC 70, through a wired network, a wireless network, a USB cable, or the like. The PC 70 provides, to the scanner 10, predetermined information according to an object to be read.

FIG. 2 is a diagram illustrating a selection screen indicating a transport length.

The object to be read may have a standard size such as A4 and B4 or may have a non-standard size. When the PC 70 controls the scanner 10, the PC 70 displays a screen as illustrated in FIG. 2 on a not-illustrated display unit, and receives designation of the paper size of the object to be read, from a user.

In FIG. 2, choices such as A3 portrait, A4 portrait, A4 landscape, B4 portrait, B5 portrait, and B5 landscape and a free length choice in which the length is freely designated are displayed as the object to be read. When the user selects a standard such as A3 portrait, A4 portrait, A4 landscape, B4 portrait, B5 portrait, and B5 landscape, the PC 70 designates a transport length corresponding to each paper standard to the controller 20. Further, when the user selects the free length to designate a predetermined length, the PC 70 designates a designated length as the transport length to the controller 20. In the scanner 10, in the case of the transport apparatus, the transport length is a read length.

Figure 3:
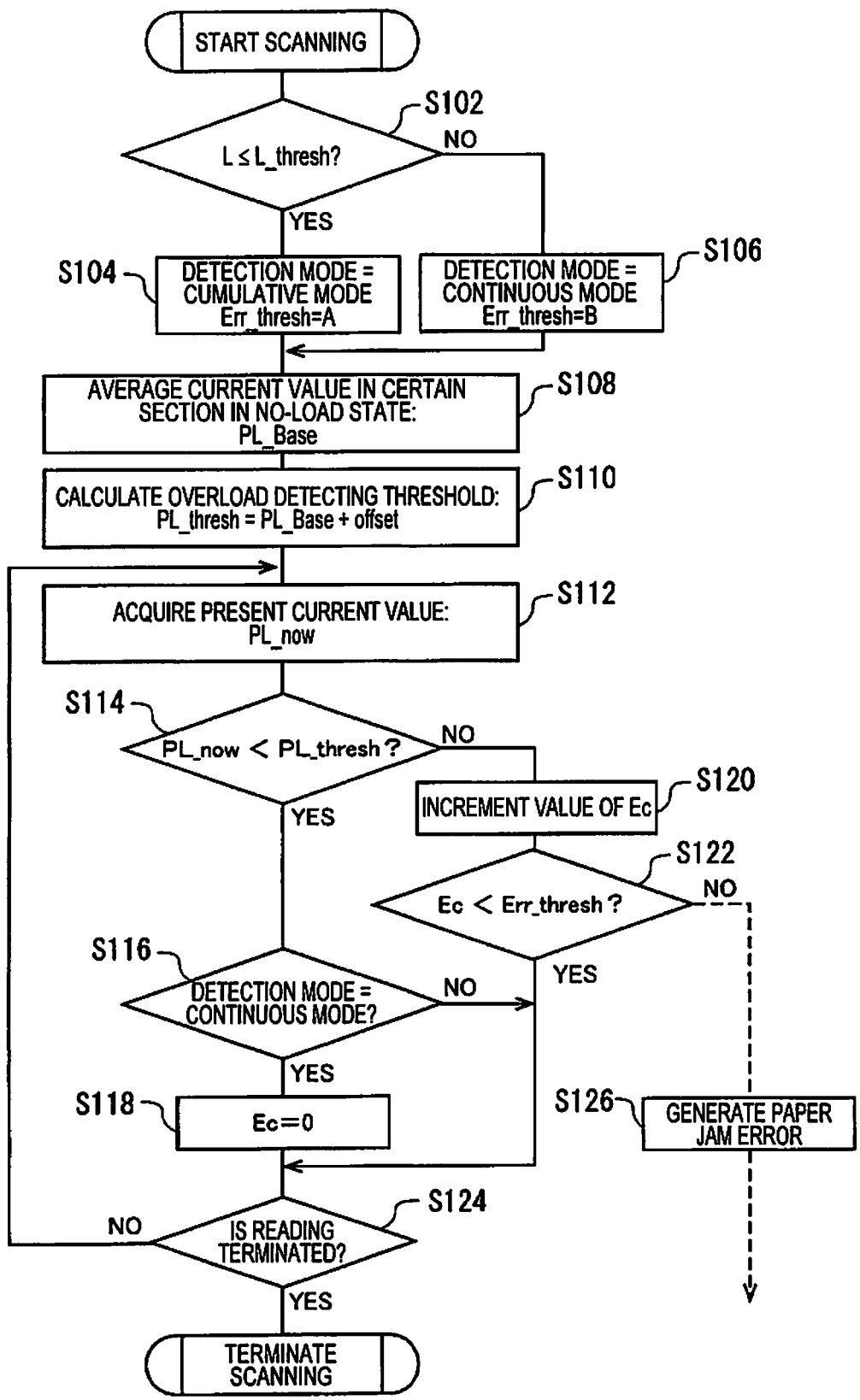
FIG. 3 is a flowchart illustrating a procedure of detecting transport abnormality performed by the scanner.

FIG. 3 is a flowchart illustrating a procedure of detecting transport abnormality performed by the scanner 10.

When scanning starts, the controller 20 compares the transport length (the read length) L provided from the PC 70 with a threshold L_thresh for switching a detection mode, in step S102. The transport length L is notified to the controller 20 by the PC 70 in response to a user's selection operation on the selection screen illustrated in FIG. 2. However, the controller 20 may display the selection screen illustrated in FIG. 2 on the not-illustrated display unit of the scanner 10, to acquire the transport length L according to the user's selection operation on the selection screen.

When the transport length L is longer than the threshold L_thresh, the controller 20 designates the detection mode to a "continuous" mode, and sets a predetermined value B to an error number threshold Err_thresh for determining that a transport error has occurred, in step S106. Meanwhile, when the transport length L is equal to or shorter than the threshold L_thresh, the controller 20 designates the detection mode to a "cumulative" mode, and sets a predetermined value A to the error number threshold Err_thresh for determining that a transport error has occurred, in step S104.

Here, the "continuous" mode is an operation state in which it is determined that a transport error occurs when a state in which a current value, which is output of the load detecting sensor 32, is equal to or more than a predetermined threshold (a current value) continues for a predetermined threshold (the predetermined number of times) or more. Further, the "cumulative" mode is a detection mode in which it is determined that a transport error occurs when the total number of times by which the current value, which is the output of the load detecting sensor 32, is equal to or more than the predetermined threshold (the current value) is equal to or more than a predetermined threshold.

In this example, the controller 20 acquires the transport length as the type of the medium, and sets the continuous mode to the detection mode on the assumption that the medium having the transport length L more than the transport length threshold L_thresh is a first medium. The controller 20 sets the cumulative mode to the detection mode on the assumption that the medium having the transport length L equal to or less than the transport length threshold L_thresh is a second medium. 15.3 inches is designated as the transport length threshold L_thresh.

An optimum value is obtained through experiments as to how to set the transport length threshold L_thresh. However, in general, it is preferable that the transport length threshold L_thresh is equal to or more than 10 inches and equal to or less than 20 inches. In this example, 15.3 inches is the most desirable value.

The value A is larger than (not smaller than) the value B. In the continuous mode, when an abnormal current value is detected, and the state continues for a certain period, it is determined that a current state is an abnormal state. It is determined that the current state is the abnormal state, based on the number of times by which such a continuous state appears. Meanwhile, in the cumulative mode, whenever an abnormal current value is detected, counting is performed, and it is determined that the current state is the abnormal state, based on the number of occurrences. Because of the continuous mode in which the counting is not performed as an abnormal value when the state in which the abnormal current value is detected does not continue and the cumulative mode in which the counting is performed as the abnormal value when the state occurs even once, the former threshold value B is set to a value that is smaller than the latter threshold value A.

Next, in step S108, the controller 20 acquires an average current value PL_Base in a certain section in a no-load state. When the transport mechanism 30 is driven in the no-load state, the DC motor 31 outputs a minimum driving force required to drive various driving mechanisms constituting the transport path. A current value necessary for outputting this driving force is a minimally required current value, and the controller 20 sets an overload detecting threshold to a value obtained by adding an offset to the minimally required current value, in step S110.

As in PL_thresh=PL_Base+offset, a value obtained by adding a predetermined offset value to an average of current values in the transportation of the predetermined length in the no-load state is set as a threshold for determining whether there is abnormality, that is, the overload detecting threshold PL_thresh.

As described above, in the past, the overload detecting threshold is a fixed value. However, due to deterioration of the DC motor 31 and individual differences of mechanical elements constituting the transport mechanism 30 of each scanner 10, the minimum current value required to drive the transport mechanism 30 varies. However, in the present embodiment, since the minimum current value of each scanner 10 is obtained by driving the transport mechanism 30 in the no-load state before the transportation starts, appropriate overload detection is possible.

When the overload detecting threshold PL_thresh is calculated, the controller 20 acquires the present current value PL_now from the load detecting sensor 32, in step S112, and compares the current value PL_now with the overload detecting threshold PL_thresh, in step S114.

When the present current value PL_now acquired by the load detecting sensor 32 is lower than the overload detecting threshold PL_thresh, the controller 20 determines whether or not the detection mode is the "continuous mode", in step S116, does not process anything unless the detection mode is the "continuous mode", and determines whether or not reading is terminated, in step S124. The abnormality process is repeated until the reading is terminated.

When the present current value PL_now is lower than the overload detecting threshold PL_thresh, there is no abnormality, and there is no need to perform any particular process. When it is determined in step S116 that the detection mode is the "continuous mode", the controller 20 resets a variable Ec for counting the number of errors, in step S118. At a time point when the flowchart of FIG. 3 starts, the variable Ec is reset.

In the continuous mode, the variable Ec is used to determine whether or not a state in which the current value which is the output of the load detecting sensor 32 is equal to or more than the predetermined threshold (the current value) continues for a predetermined threshold (the predetermined number of times) or more. Thus, since it can be said that the state does not continue at a time point when the present current value PL_now is lower than the overload detecting threshold PL_thresh, the controller 20 resets the variable Ec, in step S118.

Meanwhile, in the cumulative mode, the variable Ec is used to count the total number of times by which the current value which is the output of the load detecting sensor 32 is equal to or more than the predetermined threshold (the current value). Thus, even when the present current value PL_now is lower than the overload detecting threshold PL_thresh, the total number of times is irrelevant, and thus the controller 20 does not reset the variable Ec.

As a result of the comparison in step S114, when the present current value PL_now acquired by the load detecting sensor 32 is equal to or more than the overload detecting threshold PL_thresh, the controller 20 increases the variable Ec for counting the number of errors, in step S120, and then determines whether or not the variable Ec is equal to or more than the predetermined error number threshold Err_thresh, in step S122.

In both the continuous mode and the cumulative mode, a value for performing the determination in step S122 is set to the error number threshold Err_thresh in steps S104 and S106. Therefore, the controller 20 compares the variable Ec corresponding to the present number of errors with the error number threshold Err_thresh, and when the variable Ec corresponding to the number of errors is equal to or more than the error number threshold Err_thresh, determines whether or not the paper jam has occurred, in step S126. In case of long manuscript When the transport length is 100 inches as an example of a long length, the PC 70 acquires and notifies the user's selection operation on the selection screen illustrated in FIG. 2 to the controller 20. The controller 20 determines the type of the medium based on the transport length L, in step S102. That is, the controller 20, which is a processor, acquires the type of the medium based on information on the transport length L. In this example, 100 inches which is the transport length L exceeds 15.3 inches which is the transport length threshold L_thresh, and the controller 20 sets the detection mode to the "continuous" mode and sets the value B to the error number threshold Err_thresh, in step S106.

While the long manuscript is transported, the transport mechanism 30 may be in an overload state. However, as long as there is no original abnormality, an overload state does not continue for a certain period. Even when the variable Ec corresponding to the number of errors increases, the variable Ec is reset before the variable Ec actually becomes equal to or more than the error number threshold Err_thresh. Even when the transport mechanism 30 becomes overloaded several times, the variable Ec is reset in the continuous mode unless the overload state continues. Thus, it is not easy to detect the overload state even in the case of the long length.

Above all, when the paper jam occurs really, the variable Ec corresponding to the number of errors immediately becomes equal to or more than the error number threshold Err_thresh, and the paper jam is notified. In case of A4 document When the user selects A4 portrait on the selection screen illustrated in FIG. 2, the PC 70 notifies the controller 20 that the transport length is 11.7 inches which is the length of A4 portrait. The controller 20 determines the type of the medium based on the transport length L, in step S102. In this example, since 11.7 inches which is the transport length L exceeds 15.3 inches which is the transport length threshold L_thresh, the controller 20 sets the detection mode to the "cumulative" mode and sets the value A to the error number threshold Err_thresh, in step S104.

While A4 portrait is transported, the transport mechanism 30 may be in an overload state. However, the number of occurrences is not so large as long as there is no original abnormality. Even when the variable Ec corresponding to the number of errors increases, the transportation is terminated before the variable Ec actually becomes equal to or more than the error number threshold Err_thresh. Of course, in many cases, it is expected that no error occurs. Thus, in the cumulative mode, the controller 20 may store a cumulative value of the number of occurrences of errors as the variable Ec with no problem.

Above all, even in the case of the A4 document, when the paper jam occurs really, the variable Ec corresponding to the number of errors immediately becomes equal to or more than the error number threshold Err_thresh, and the paper jam is notified.

CONCLUSION

As described above, according to the present embodiment, the scanner 10 includes the transport mechanism 30, the load detecting sensor 32, and the controller 20 as a processor that receives a result of the detection by the load detecting sensor 32 and controls transportation by the transport mechanism 30. Thus, the controller 20 acquires the type of the medium transported by the transport mechanism 30, and determines whether the transportation is normal or abnormal, based on the acquired type of the medium and the output of the load detecting sensor 32. That is, the controller 20 can more appropriately detect the abnormal state by changing a criterion for determining transportation abnormality according to the type of the medium.

Further, according to the present embodiment, the controller 20, if the received type of the medium is the first medium, when a state in which the output of the load detecting sensor 32 is equal to or more than a predetermined threshold (the overload detecting threshold PL_thresh) continues for a predetermined threshold (the error number threshold Err_thresh), determines that the transportation is abnormal, and if the received type of the medium is the second medium, when the total number of times by which the output of the load detecting sensor 32 is equal to or more than the predetermined threshold (the overload detecting threshold PL_thresh) is equal to or more than the predetermined threshold (the error number threshold Err_threshold), determines that the transportation is abnormal. That is, the controller 20 switches by which method whether or not the transportation is abnormal is determined using any one of the number of times by which an abnormal value of the output of the load detecting sensor 32 continuously occurs and the total number of times by which the abnormal value occurs, according to the type of the medium (whether the medium is the first medium or the second medium).

Further, according to the present embodiment, the controller 20 determines that the medium of which the transport length is longer than the transport length threshold L_thresh is the first medium and determines that the medium of which the transport length is shorter than the transport length threshold L_thresh is the second medium, so as to acquire the type of the medium. Thus, whether or not the transportation is abnormal can be determined for each of the type of the medium (the first medium) of which the transport length is longer than the threshold and the type of the medium (the second medium) of which the transport length is shorter than the threshold.

Further, according to the present embodiment, referring to the flowchart of FIG. 3, when the output of the load detecting sensor 32 is a waveform (a first pattern) in which the current value PL_now is equal to or more than the overload detecting threshold PL_thresh continuously for the value B times or more, if the medium is the first medium, the error number threshold Err_thresh=the value B is satisfied, and thus the controller 20 reaches determination from the step S122 to step S126. However, even when the output of the load detecting sensor 32 is represented by the first pattern, if the medium is the second medium, the error number threshold Err_thresh=the value A is satisfied, and in the first embodiment, the value B<the value A is satisfied as described above. Thus, the process proceeds from the step S122 to step S124 without proceeding to S126. That is, according to the present embodiment, when the load detecting sensor 32 outputs the first pattern, the controller 20 determines that the transportation is abnormal if the received medium is the first medium, and determines that the transportation is not abnormal if the received medium is the second medium.

Further, in such a configuration, it is also possible to express that when the load detecting sensor 32 outputs the first pattern, the controller 20 determines that the transportation is abnormal if the received medium is the first medium, and determines that the transportation is not abnormal if the received medium is the second medium of which the transport length is shorter than the transport length of the first medium.

Further, when the output of the load detecting sensor 32 is a waveform (a second pattern) in which the current value PL_now is equal to or more than the overload detecting threshold PL_thresh for the total value A times or more, if the medium is the second medium, the error number threshold Err_thresh=the value A is satisfied, and thus the controller 20 reaches determination from step S122 to step S126. However, the second pattern is not equal to the first pattern. Therefore, even when the output of the load detecting sensor 32 is represented by the second pattern, if the medium is the first medium, the process proceeds from the step S122 to step S124 without proceeding to S126. That is, according to the present embodiment, when the load detecting sensor 32 outputs the second pattern, the controller 20 determines that the transportation is abnormal if the received medium is the second medium, and determines that the transportation is not abnormal if the received medium is the first medium.

Second Embodiment

In the above-described embodiment, the type of the medium to be transported is specified by the transport length, and the detection mode is selected according to the transport length, so that the overload state is properly detected. However, a factor of selecting the detection mode is not limited to the transport length.

Figure 4:
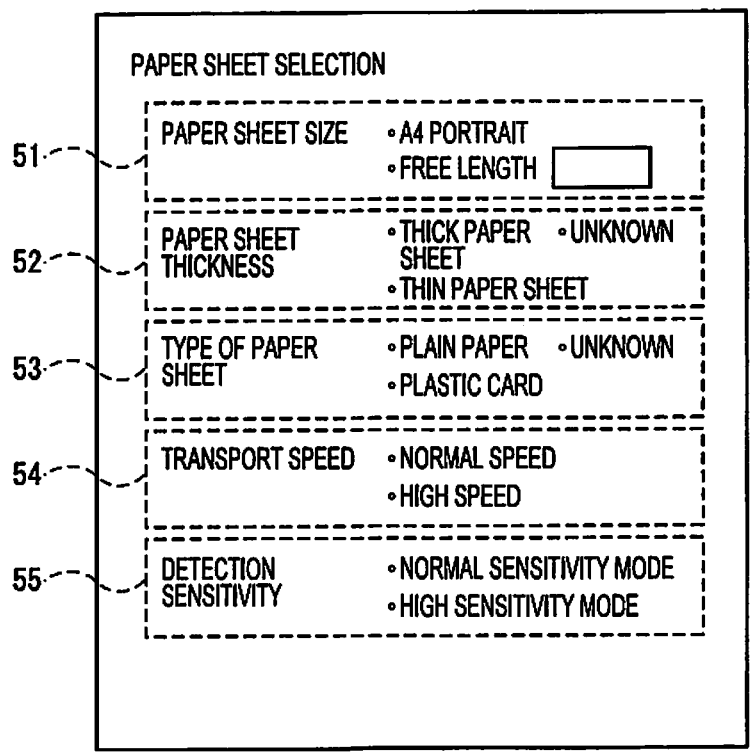
FIG. 4 is a diagram illustrating a selection screen including other options in paper selection.

FIG. 4 is a diagram illustrating a selection screen including other options in paper selection.

A selection area 51 for the size of a paper sheet, which is like FIG. 2, a selection area 52 for the thickness of a paper sheet, a selection area 53 for the type of a paper sheet, a selection area 54 for a transport speed of the transport mechanism 30, and a selection area 55 for detection sensitivity are illustrated in FIG. 4. The selection area 51 for the size of a paper sheet is the same as the selection area according to the above-described embodiment.

A thick paper option, a thin paper option, and an unknown option are prepared in the selection area 52 for the thickness of a paper sheet. Since it is good to determine whether the transportation is abnormal earlier in the thin paper option than in the thick paper option, the controller 20 sets the detection mode to the continuous mode when the thick paper option is selected. Further, for example, the error number threshold Err_thresh may be larger when the thick paper option is selected than when the thin paper option is selected. The user inputs the thickness of a paper sheet, and the controller 20 may compare the thickness input by the user with a predetermined thickness threshold, may determine that a paper sheet is a thick paper sheet if the thickness of the paper sheet is more than the thickness threshold, and may determine that the paper sheet is a thin paper sheet if the thickness of the paper sheet is equal to or less than the thickness threshold. However, the selection may be ideationally performed depending on subjectivity of the user.

A plain paper option, a plastic card option, and an unknown option are prepared in the selection area 53 for the type of a paper sheet. The plastic card option has a large transport load, which is like the thick paper option, and it is good to determine whether the transportation is abnormal earlier in the plain paper option than in the plastic card option in an overload state in which a transport error occurs. Therefore, when the plastic card option is selected, the controller 20 sets the detection mode to the continuous mode. Further, the error number threshold Err_thresh may be larger when the plastic card option is selected than when the plain paper option is selected.

A normal speed option and a high speed option are prepared in the selection area 54 for a transport speed. The high speed option has a large transport load, which is like the thick paper sheet, and it is good to determine whether the transportation is abnormal earlier in the normal speed option than in the high speed option in an overload state in which a transport error occurs. Therefore, when the high speed option is selected, the controller 20 sets the detection mode to the continuous mode. Further, the error number threshold Err_thresh may be larger when the high speed option is selected than when the normal speed option is selected.

A normal sensitivity mode option and a high sensitivity mode option are prepared in the selection area 55 for detection sensitivity, and any one thereof can be set. Since it is desired to detect whether the transportation is abnormal early in the high sensitivity mode option, the controller 20 may set the error number threshold Err_thresh to be larger when the normal sensitivity mode option is selected than when the high sensitivity mode option is selected.

The transport speed and the detection sensitivity are not the type of the medium. That is, an element that is not the type of the medium may be also a factor that selects a transport error detecting mode.

The flowchart will be described based on the above setting policy.

Figure 5:
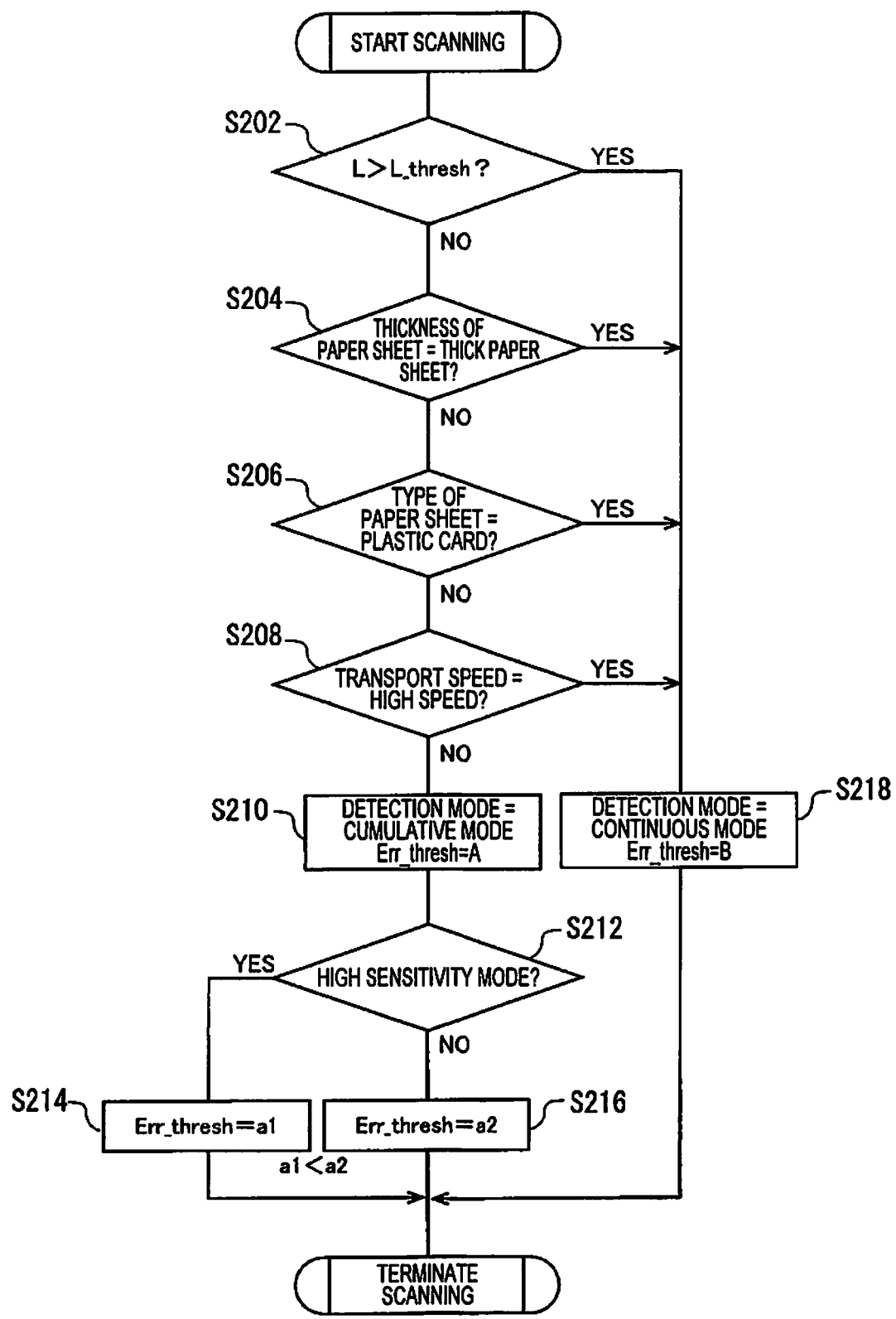
FIG. 5 is a flowchart illustrating a procedure of detecting transport abnormality performed by the scanner.

FIG. 5 is a flowchart illustrating a procedure of detecting transport abnormality performed by the scanner according to a second embodiment.

This flowchart corresponds to a part of the flowchart illustrated in FIG. 3, and is replaced with steps S102, S104, and S106.

When scanning starts, the controller 20 receives, from the PC 70, notification on selection information on the size of the paper sheet, the thickness of the paper sheet, the type of the paper sheet, the transport speed, and the detection sensitivity, which are received by the PC 70 through the selection screen illustrated in FIG. 4. Of course, the controller 20 may display the selection screen illustrated in FIG. 4 on the not-illustrated display unit of the scanner 10, to receive the user's selection operation on the selection screen.

The controller 20 compares the transport length (the read length) L with the threshold L_thresh for switching a detection mode, in step S202. This process is the same as step S102. When the transport length L is longer than the threshold L_thresh, the controller 20 designates the detection mode to the "continuous" mode, and sets the predetermined value B to the error number threshold Err_thresh for determining that a transport error has occurred, in step S218.

Meanwhile, when the transport length L is equal to or shorter than the threshold L_thresh, the controller 20 determines whether the paper sheet is the thick paper sheet based on the information on the thickness of the paper sheet, in step S204, and when the paper sheet is the thick paper sheet, designates the detection mode as the "continuous" mode, in step S218, which is like a case where the paper sheet has a long length.

Further, when the thickness of the paper sheet corresponds to the thick paper sheet, the controller 20 determines whether the paper sheet is the plastic card based on the information on the type of the paper sheet, in step S206, and when the paper sheet is the plastic card, designates the detection mode as the "continuous" mode, in step S218, which is like the case where the paper sheet has a long length.

Further, when the type of the paper sheet is not the plastic card, the controller 20 determines whether a current speed corresponds to the high speed option based on the information on the transport speed, in step S208, and when the current speed corresponds to the high speed option, designates the detection mode as the "continuous" mode, in step S218, which is like the case where the thick paper sheet has a long length.

When it is determined based on the information on the transport speed that the current speed does not correspond to the high speed option, the controller 20 proceeds from the step S208 to step S210, and designates the detection mode as the "cumulative" mode.

When YES is determined in any one of steps S202, S204, and S206, the controller 20 determines that the medium is the first medium, based on the received information, and designates the detection mode as the continuous mode, in step S218. When the detection mode is designated as the continuous mode, the controller 20 determines that the transportation is abnormal, when a state in which the output of the load detecting sensor 32 is equal to or more than the predetermined threshold continues for a predetermined threshold or more.

When NO is determined in any one of steps S202, S204, and S206, the controller 20 determines that the medium is the second medium, based on the received information When the detection mode is designated as the cumulative mode, the controller 20 determines that the transportation is abnormal, when the total number of times by which the output of the load detecting sensor 32 is equal to or more than the or outputs a first pattern, equal to or more than the predetermined threshold.

When the detection sensitivity is selected on the selection screen, and the high sensitivity mode option is selected, the controller 20 determines that a current mode corresponds to the high sensitivity mode option, in step S212, and sets a predetermined value a1 to the error number threshold Err_thresh, in step S214. Meanwhile, when not the high sensitivity mode option but the normal sensitivity mode option is selected, the controller 20 determines that the current mode corresponds to the normal sensitivity mode option, in step S212, and sets a predetermined value a2 to the error number threshold Err_thresh, in step S216.

In this way, the value a1 is set in the high sensitivity mode option, and the value a2 is set in the normal sensitivity mode option. In these values, a1<a2 is satisfied. That is, in the case of the high sensitivity mode option, a value of the error number threshold Err_thresh when it is detected that the transportation is abnormal is small, and thus it is detected that the transportation is abnormal, at an early time.

As described above, when the detection mode is set in one of steps S210 and S218 and the error number threshold Err_thresh is set in one of steps S214, S216, and S218, the controller 20 executes processing of step S108 and subsequent steps in the first embodiment.

In this way, the controller 20 determines the type of the medium, in steps S202, S204, and S206, and determines setting of the transport speed, in step S208. Thus, in the second embodiment, the controller 20 is configured to determine whether the transportation is normal or abnormal, based on the transport speed of the transport mechanism 30, the type of the medium, and the output of the load detecting sensor 32.

Further, the controller 20 can set at least a normal sensitivity and a high sensitivity as the detection sensitivity with respect to the transportation abnormality, through the operation on the selection screen of FIG. 4 by the user, and determines setting of the detection sensitivity in step S212. Thus, in the second embodiment, the controller 20 is configured to determine whether the transportation is normal or abnormal, based on the detection sensitivity, the type of the medium, and the output of the load detecting sensor 32.

According to such a configuration, the controller 20 can more appropriately detect the abnormal state by changing a criterion for determining transportation abnormality according to not only the type of the medium but also elements other than the type of the medium.

In the selection screen of FIG. 4, for example, an option such as a low speed option in addition to the normal speed option and the high speed option may be provided in the selection area 54 for a transport speed. Even in such a case, the controller 20 may perform the determination in step S208 depending on whether or not the transport speed is set to the high speed option.

Further, in the selection screen of FIG. 4, for example, an option such as a low sensitivity mode option in addition to the normal sensitivity mode option and the high sensitivity mode option may be provided in the selection area 55 for detection sensitivity. Even in such a case, the controller 20 may perform the determination in step S212 depending on whether or not the detection sensitivity is set to the high sensitivity mode option. Alternatively, when the detection sensitivity is set to the low sensitivity mode option, the controller 20 may set a value larger than the value a2 set in step S216 as the error number threshold Err_thresh.

The present embodiment also discloses a configuration in which some steps of the flowchart of FIG. 5 are omitted.

In the flowchart of FIG. 5, for example, a configuration not including steps S212, S214, and S216 can be extracted. In this case, the controller 20 sets the detection mode to the cumulative mode, and sets the error number threshold Err_thresh to the predetermined value A, in step S210. However, the controller 20 sets the detection mode to the continuous mode and sets the error number threshold Err_thresh to the predetermined value B, in step S218, and then executes the processing of step S108 and subsequent steps in the first embodiment.

Further, in the flowchart of FIG. 5, a configuration not including step S208 can be extracted. In this case, when NO is determined in all of steps S202, S204, and S206, that is, when it is determined that the type of the medium is the second medium, the controller 20 proceeds to step S210.

Further, in the flowchart of FIG. 5, a configuration not including steps S208, S212, S214, and S216 can be extracted. In this case, when NO is determined in all of steps S202, S204, and S206, the controller 20 proceeds to step S210. Thus, the controller 20 sets the detection mode to the cumulative mode, and sets the error number threshold Err_thresh to the predetermined value A, in step S210. However, the controller 20 sets the detection mode to the continuous mode and sets the error number threshold Err_thresh to the predetermined value B, in step S218, and then executes the processing of step S108 and subsequent steps in the first embodiment.

When the type of the medium includes a plurality of elements, the controller 20 specifies the type of an element used to determine whether the type of the medium is the first medium or the second medium, based on a predetermined priority. That is, the controller 20 executes the determinations for various elements such as the transport length of the medium, the thickness, and the type of the paper sheet, according to a predetermined priority. As a result, the controller 20 executes the determinations of steps S202, S204, and S206 in an order illustrated in FIG. 5. In addition, a list is prepared separately according to the priority, and it is determined whether or not an item is selected in an order from the top of the same list. When there is an item selected at the highest level, the detection mode and the error number threshold Err_thresh may be selected according to the type of the medium. Further, whether or not the item corresponds to the continuous mode is determined. When there is no item corresponding to the continuous mode, an item having the smallest value to be set as the error number threshold Err_thresh among the selected type of the medium may be preferentially set.

Further, referring to FIG. 5, in the second embodiment, a configuration not including steps S206, S208, S212, S214, and S216 and a configuration not including step S204, S208, S212, S214, and S216 can be extracted.

In most cases, each element compared with each threshold described in the present embodiment is either higher or lower than a comparison target threshold. Thus, to which step the process is branched when the element coincides with the threshold may be freely set upon implementation. For example, according to the description of FIG. 3 and FIG. 5, the medium having the transport length L that is equal to or shorter than the transport length threshold L_thresh is classified as the second medium. Otherwise, although the medium may be classified as the second medium, when the transport length L is equal to the transport length threshold L_thresh, the medium may be classified as the first medium. Further, according to the description so far, it is determined that the medium having the thickness that is equal to or less than the thickness threshold is not the thick paper sheet, and thus the medium is classified as the second medium. Otherwise, although the medium may be classified as the second medium, when the thickness is equal to the thickness threshold, the medium may be classified as the thick paper sheet, that is, the first medium.

Further, in this embodiment, even if the same medium is actually transported, when the user selects the correct type of the medium on the selection screen or when the user selects an incorrect type of the medium on the selection screen, different modes are selected. When the correct type of the medium is selected, it can be detected that the transportation is abnormal, and thus the transportation can be interrupted. However, since the incorrect type of the medium is selected, it cannot be detected that the transportation is abnormal, the transportation is continuously performed, and thus the medium may be damaged. In contrast, when the correct type of the medium is selected, the transportation is normally terminated. However, since the incorrect type of the medium is selected, it may be erroneously determined that the transportation is abnormal. Therefore, a method in which the type of medium to be actually transported is automatically determined using a medium determining sensor and a mode is selected according to the determined type of the medium can be adopted as a method that obtains high accuracy although costs are high. For example, a thickness measuring instrument that measures the thickness of the medium and a chip communication device that communicates with an IC chip embedded in the medium are considered as the medium determining sensor.

It is apparent that the invention is not limited to the above-described embodiments. As will be appreciated by those skilled in the art, application of mutually replaceable components and configurations disclosed in the embodiments by appropriately changing a combination thereof, application of mutually replaceable components and configurations by replacing the mutually replaceable components and configurations with members and configurations not disclosed in the embodiments but widely known and by appropriately changing a combination thereof, and application of mutually replaceable components and configurations by replacing the mutually replaceable components and configurations with members and configurations not disclosed in the embodiments but considered as substitutes of members and configurations disclosed in the embodiments by those skilled in the art based on the widely-known technologies and the like and by appropriately changing a combination thereof are disclosed as one embodiment of the invention.

For example, the transport apparatus can be applied to an apparatus which outputs an image generated by scanning when the transportation is abnormal, when being applied to a scanner, can be applied to an apparatus that outputs a printed matter when the transportation is abnormal, when being applied to a printing apparatus, and can be applied to an apparatus that outputs a book when the transportation is abnormal, when being applied to a bookbinding apparatus.

Further, when it is determined that the transportation is abnormal, the user or an administrator of the apparatus may be notified of occurrence of the transportation abnormality and the transportation may be stopped immediately. Otherwise, the transportation may be stopped so as not to transport a next medium after ejecting the medium being transported.

What is claimed is:

1. A transport apparatus, comprising:
a transport mechanism that transports a medium;
a sensor that detects a load on the transportation of the transport mechanism; and
a processor that receives a result of the detection by the sensor and controls the transportation by the transport mechanism,
wherein the processor acquires a type of the medium to be transported, and determines whether the transportation is normal or abnormal based on the acquired type of the medium and output of the sensor,
wherein the processor,
when the acquired medium is a first medium, if a state in which the output of the sensor is equal to or more than a predetermined threshold continues for a first predetermined number of times or more, determines that the transportation is abnormal, and
when the acquired medium is a second medium, if the total number of times by which the output of the sensor is equal to or more than the predetermined threshold is equal to or more than a second predetermined number of times, determines that the transportation is abnormal,
wherein when the sensor outputs a first pattern,
the processor determines that the transportation is abnormal when the acquired medium is the first medium, and determines that the transportation is not abnormal when the acquired medium is the second medium having a transport length that is shorter than a transport length of the first medium.

2. The transport apparatus according to claim 1,
wherein the processor acquires the type of the medium based on a transport length of the medium.

3. The transport apparatus according to claim 2,
wherein a transport length threshold is equal to or more than 10 inches and is equal to or less than 20 inches.

4. The transport apparatus according to claim 1,
wherein the first medium is a medium having a thickness that is larger than a thickness threshold, the second medium is a medium having a thickness that is smaller than the thickness threshold, and the processor compares the thickness of the medium with the thickness threshold and acquires the type of the medium based on a result of the comparison.

5. The transport apparatus according to claim 1,
wherein when the type of the medium includes a plurality of elements, the processor specifies a type of an element used to determine whether the medium is the first medium or the second medium, based on a predetermined priority.

6. The transport apparatus according to claim 1,
wherein when the sensor outputs a second pattern,
the processor determines that the transportation is abnormal when the acquired medium is the second medium, and determines that the transportation is not abnormal when the acquired medium is the first medium.

7. A transport apparatus comprising:
a transport mechanism that transports a medium;
a sensor that detects a load on the transportation of the transport mechanism; and
a processor that receives a result of the detection by the sensor and controls the transportation by the transport mechanism,
wherein the processor acquires a type of the medium to be transported, and determines whether the transportation is normal or abnormal based on the acquired type of the medium and output of the sensor,
wherein the processor determines whether the transportation is normal or abnormal, based on a transport speed of the transport mechanism, the type of the medium, and the output of the sensor.

8. A transport apparatus comprising:
a transport mechanism that transports a medium;
a sensor that detects a load on the transportation of the transport mechanism; and
a processor that receives a result of the detection by the sensor and controls the transportation by the transport mechanism,
wherein the processor acquires a type of the medium to be transported, and determines whether the transportation is normal or abnormal based on the acquired type of the medium and output of the sensor,
wherein at least normal sensitivity and high sensitivity is set as sensitivity with respect to transportation abnormality, and the processor determines whether the transportation is normal or abnormal, based on the set sensitivity, the type of the medium, and the output of the sensor.

9. A transport apparatus comprising:
a transport mechanism that transports a medium;
a sensor that detects a load on the transportation of the transport mechanism; and
a processor that receives a result of the detection by the sensor and controls the transportation by the transport mechanism,
wherein the processor acquires a type of the medium to be transported, and determines whether the transportation is normal or abnormal based on the acquired type of the medium and output of the sensor,
wherein the sensor is a sensor that measures a current value of a driving source, and the processor sets a value obtained by adding a predetermined offset value to an average of current values in the transportation of a predetermined length in a no-load state, as a threshold for determining presence or absence of abnormality.

10. A transport apparatus comprising:
a transport mechanism that transports a medium;
a sensor that detects a load on the transportation of the transport mechanism; and
a processor that receives a result of the detection by the sensor and controls the transportation by the transport mechanism,
wherein the processor acquires a type of the medium to be transported, and determines whether the transportation is normal or abnormal based on the acquired type of the medium and output of the sensor,
wherein the processor,
when the acquired medium is a first medium, if a state in which the output of the sensor is equal to or more than a predetermined threshold continues for a predetermined threshold or more, determines that the transportation is abnormal, and
when the acquired medium is a second medium, if the total number of times by which the output of the sensor is equal to or more than the predetermined threshold is equal to or more than a predetermined threshold, determines that the transportation is abnormal,
wherein the first medium is a plastic card, and the second medium is a plain paper.

* * * * *